(12) United States Patent
Lin et al.

(10) Patent No.: US 11,287,925 B2
(45) Date of Patent: Mar. 29, 2022

(54) ELECTRONIC CIRCUIT ADAPTED TO DRIVE A DISPLAY PANEL WITH TOUCH SENSORS AND OPERATION METHOD THEREOF

(71) Applicant: Novatek Microelectronics Corp., Hsinchu (TW)

(72) Inventors: Chung-Cher Lin, Hsinchu County (TW); Yun-Hsiang Yeh, Hsinchu County (TW); Ta-Keng Weng, Taichung (TW); Yi-Min Li, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 33 days.

(21) Appl. No.: 16/995,780

(22) Filed: Aug. 17, 2020

(65) Prior Publication Data

US 2021/0089188 A1 Mar. 25, 2021

Related U.S. Application Data

(60) Provisional application No. 62/902,400, filed on Sep. 19, 2019.

(51) Int. Cl.
*G06F 3/041* (2006.01)
*G09G 3/20* (2006.01)

(52) U.S. Cl.
CPC ........ *G06F 3/04166* (2019.05); *G06F 3/0412* (2013.01); *G09G 3/20* (2013.01); *G09G 2310/08* (2013.01)

(58) Field of Classification Search
CPC ..... G06F 3/04166; G06F 3/0412; G09G 3/20; G09G 2310/08
See application file for complete search history.

(56) References Cited

U.S. PATENT DOCUMENTS 10,656,751 B2 5/2020 Chan et al.
2008/0224986 A1* 9/2008 Huang ................ G09G 3/3413
345/102

(Continued)

FOREIGN PATENT DOCUMENTS

CN 108874205 11/2018
TW 201928927 7/2019

OTHER PUBLICATIONS

"Office Action of Taiwan Counterpart Application", dated Dec. 3, 2021, p. 1-p. 3.

*Primary Examiner* — Sejoon Ahn
(74) *Attorney, Agent, or Firm* — JCIPRNET

(57) ABSTRACT

An electronic circuit, adapted to drive a display panel comprising touch sensors, is provided. The electronic circuit can include a display driving circuit, a timing circuit and a touch scan circuit. The display driving circuit drives a touch display panel. The timing circuit receives a flag signal from a processing circuit and generates a scan start signal according to the flag signal. The touch scan circuit generates a plurality of touch scan signals according to the scan start signal and a touch column synchronization signal. The touch scan circuit determines a start time of a touch frame period according to a pulse of the scan start signal. The scan start signal can be asynchronous or delayed with respect to a touch frame synchronization signal generated by the display driving circuit.

33 Claims, 13 Drawing Sheets

(56) References Cited

U.S. PATENT DOCUMENTS

2008/0246717 A1* 10/2008 Miyake ............... G09G 3/3696
  345/92
2018/0275827 A1   9/2018 Lin et al.
2018/0329570 A1  11/2018 Chan et al.
2019/0317630 A1  10/2019 Shaw

* cited by examiner

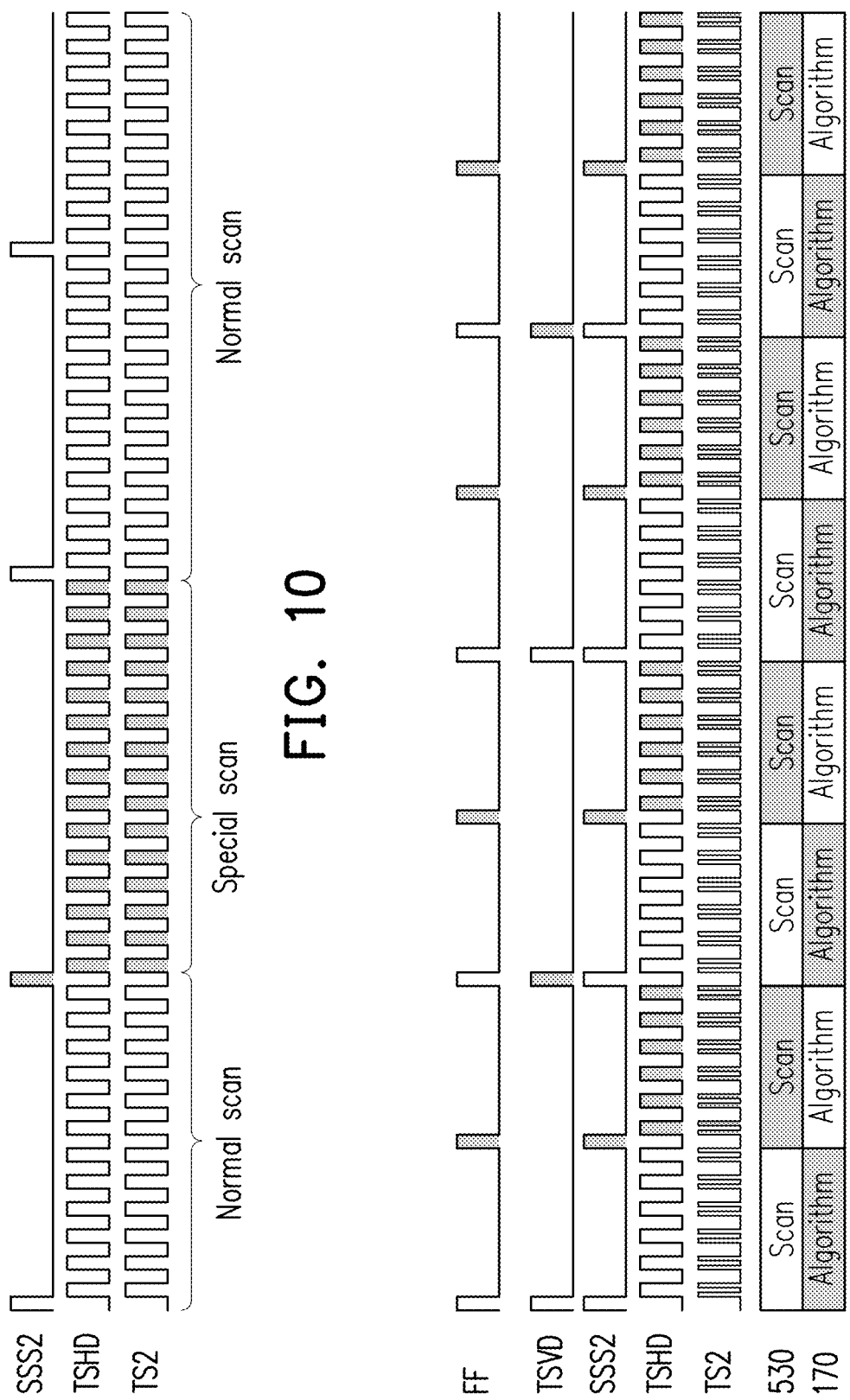

ELECTRONIC CIRCUIT ADAPTED TO DRIVE A DISPLAY PANEL WITH TOUCH SENSORS AND OPERATION METHOD THEREOF

CROSS-REFERENCE TO RELATED APPLICATION

This application claims the priority benefit of U.S. provisional application Ser. No. 62/902,400, filed on Sep. 19, 2019. The entirety of the above-mentioned patent application is hereby incorporated by reference herein and made a part of this specification.

BACKGROUND

Field of the Invention

The invention relates to an electronic circuit and more particularly, to an electronic circuit adapted to drive a display panel with touch sensors and an operation method thereof.

Description of Related Art

A display driving circuit includes a timing controller and (or) other driving circuits. The display driving circuit may control (or drive) the touch display panel to display one or a plurality of image frames. Based on a display driving operation on the touch display panel, the display driving circuit correspondingly outputs a touch frame synchronization signal and a touch column synchronization signal. The touch frame synchronization signal may define a plurality of display frame periods. The touch column synchronization signal may define a plurality of touch column periods in a display frame period.

However, a start time of a touch frame is fixed at a start time of a display frame period. Such implementation results in reduction of application flexibility.

Moreover, in special operation conditions, an algorithm executed by a processing circuit may likely be incapable of completing the processing of the touch detection data of one touch frame in time within one display frame period. In other words, the algorithm needs to take a part of time of a display frame period to complete the processing of the touch detection data of the display frame period. In this way, the touch scan circuit is idled (stopped from performing the touch scanning) during the display frame period for the algorithm executed by the processing circuit to complete the processing of the touch detection data of the display frame period. "The touch scan circuit that is idled (stopped from performing the touch scanning) during the display frame period may cause reduction of a report rate of touched positions for the processing circuit. The reduction of the report rate is easily reflected in user experience.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides an electronic circuit, adapted to drive a display panel comprising touch sensors and an operation method thereof for a touch frame to be asynchronous (unsynchronized) with a display frame period.

An electronic circuit, adapted to drive a display panel comprising touch sensors of an embodiment of the invention can include a display driving circuit, a timing circuit and a touch scan circuit. The display driving circuit is configured to drive a touch display panel and configured to generate a touch frame synchronization signal. The timing circuit is configured to receive a flag signal from a processing circuit and generate a scan start signal according to the flag signal. The touch scan circuit is coupled to the timing circuit to receive the scan start signal. The touch scan circuit is coupled to the display driving circuit to receive a touch column synchronization signal from the display driving circuit. The touch scan circuit is capable of generating a plurality of touch scan signals during a touch frame period according to the scan start signal and the touch column synchronization signal. The scan start signal is asynchronous or delayed with respect to the touch frame synchronization signal.

An electronic circuit, adapted to drive a display panel comprising touch sensors can include a timing circuit and a touch scan circuit. The timing circuit includes a delay circuit. The timing circuit is configured to receive a flag signal from a processing circuit and generate a scan start signal according to the flag signal. The touch scan circuit is coupled to the timing circuit to receive the scan start signal. The touch scan circuit is configured to generate a plurality of touch scan signals according to the scan start signal. The touch scan circuit is configured to determine a start time of a touch frame period according to a pulse of the scan start signal. The scan start signal is asynchronous or delayed with respect to a touch frame synchronization signal generated by the display driving circuit.

An electronic circuit, adapted to drive a display panel comprising touch sensors can include a display driving circuit, a timing circuit and a touch scan circuit. The display driving circuit is configured to drive a touch display panel according to a display frame frequency to display a plurality of video frames. The timing circuit is configured to receive a flag signal from a processing circuit and generate a scan start signal according to the flag signal. The touch scan circuit is coupled to the timing circuit to receive the scan start signal. The touch scan circuit determines a touch frame frequency according to the scan start signal. When the display frame frequency is not changed, the timing circuit adjusts the scan start signal to change the touch frame frequency.

An electronic circuit, adapted to drive a display panel comprising touch sensors can include a display driving circuit, a timing circuit and a touch scan circuit. The display driving circuit is configured to drive a touch display panel according to a display frame frequency to display a plurality of video frames. The timing circuit is configured to receive a flag signal from a processing circuit and generate a scan start signal according to the flag signal. The touch scan circuit is coupled to the timing circuit to receive the scan start signal. The touch scan circuit performs touch scanning according to the scan start signal. The touch scan circuit defines a touch frame period, the touch frame period starts at a mode transition time, the mode transition time is a transition time from a special mode to a normal mode, and a touch function is disabled in the special mode and is enabled in the normal mode.

Based on the above, the timing circuit described in the embodiments of the invention can generate the scan start signal according to the flag signal of the processing circuit.

Namely, the scan start signal can be related to (dependent on) an execution state of the algorithm executed by the processing circuit. The scan start signal can be unrelated to (independent of) the touch frame synchronization signal. The touch frame synchronization signal can define a plurality of display frame periods, and the start time of the touch frame period can be determined according to the pulse of the scan start signal. In this way, the electronic circuit and method described by the embodiments of the invention can render a touch frame asynchronous (unsynchronized) with a display frame period.

In order to make the aforementioned features and advantages of the invention more comprehensible, embodiments accompanying figures are described in details below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10 is a schematic timing diagram of the signals of the circuits depicted in FIG. 5 in a condition of performing special scanning according to an embodiment of the invention.

FIG. 11 is a schematic timing diagram of the signals of the circuits depicted in FIG. 5 according to another embodiment of the invention.

DESCRIPTION OF EMBODIMENTS

Figure 1:
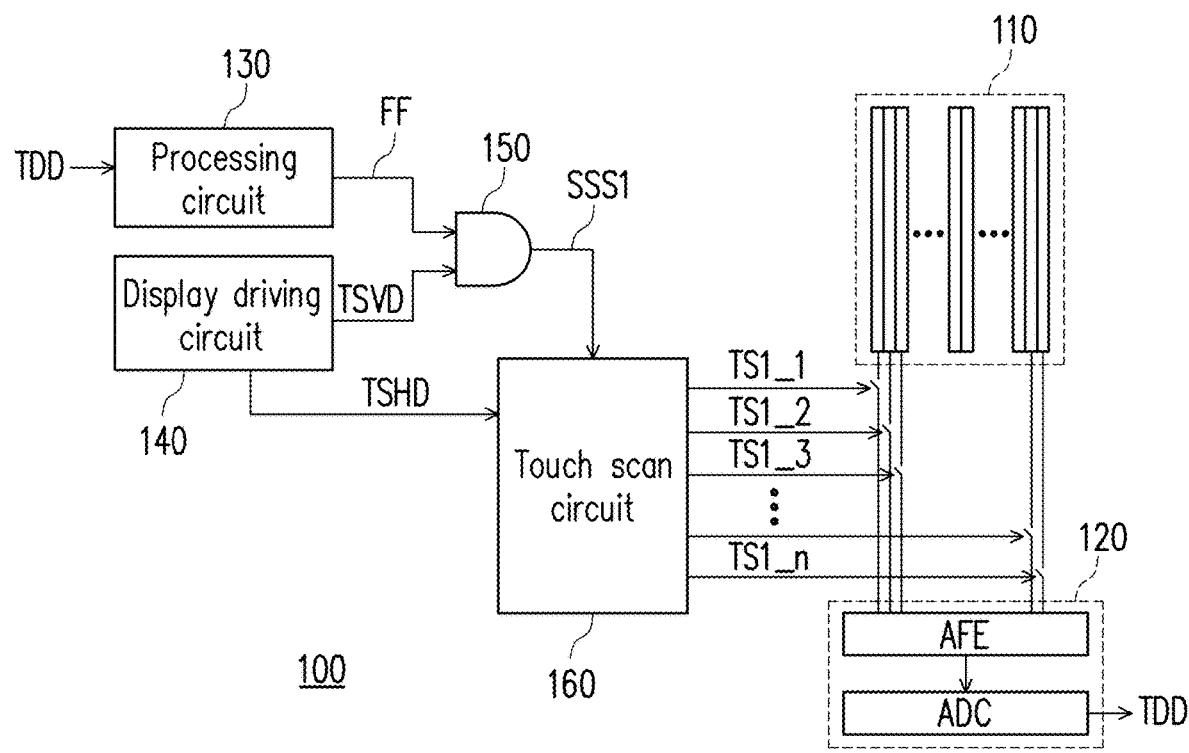
FIG. 1 is a schematic circuit block diagram illustrating a display apparatus.

The term "couple (or connect)" throughout the specification (including the claims) of this application are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

According to some embodiments, a timing circuit can generate a scan start signal according to a flag signal of a processing circuit. The scan start signal may be therefore related to or dependent on an execution state of an algorithm executed by the processing circuit. Accordingly, a touch frame can be immediately started after the excitation of the algorithm is finished by the processing circuit, without waiting for a next pulse of a touch frame synchronization signal.

According to some embodiments, a length the touch frame period or a number of a plurality of touch sensing columns scanned during the touch frame period and/or an interval between two touch frames is not fixed and can be dynamically adjusted, not limited by a touch frame synchronization signal. Accordingly, each touch frame period can be configured to be independent upon each other.

According to some or the same embodiments, a timing circuit can generate a touch frame asynchronous or unsynchronized or delayed with respect to a display frame period, achieving more flexibility to meet different application requirements. This means that the display frame period can be but not always synchronous with the touch frame. Accordingly, even when a display frame frequency is not changed, the timing circuit may be still able to adjust the scan start signal to change a touch frame frequency. Alternatively or additionally, even when the display frame frequency is changed, the timing circuit may be still able to arrange the scan start signal to maintain the touch frame frequency.

According to some or the same embodiments, a timing circuit can generate a scan start signal unrelated to or independent of a touch frame synchronization signal, which can be used to define a plurality of display frame periods, A start time of a touch frame period can be determined according to a pulse of the scan start signal. Accordingly, the touch frame can be asynchronous or unsynchronized with the display frame period. The scan start signal may include at least one pulse occurring between two neighboring pulses of the touch frame synchronization signal. This means that the touch frame can be synchronous but not always with the display frame period.

According to some or the same embodiments, the touch scanning operation can be more focused in a specific region (e.g., a touched area) and/or the touch scanning operation can be more omitted in the other region.

FIG. 1 is a schematic circuit block diagram illustrating a display apparatus 100. The display apparatus 100 illustrated in FIG. 1 includes a display panel with touch sensors, i.e., so called touch display panel 110. The touch panel 110 may be any display panel with a touch function, e.g., a conventional touch display panel or any other touch display panel. A reading circuit 120 is coupled to a plurality of touch sensing columns (e.g., touch detection electrode columns) of the touch display panel 110. Generally, the reading circuit 120 includes an analog front end (AFE) circuit, an analogue-to-digital converter (ADC) and (or) other circuits. Based on a scan operation, the reading circuit 120 may read a touch sensing result of the touch display panel 110 and output touch detection data TDD corresponding to the touch sensing result to a processing circuit 130.

Figure 2:
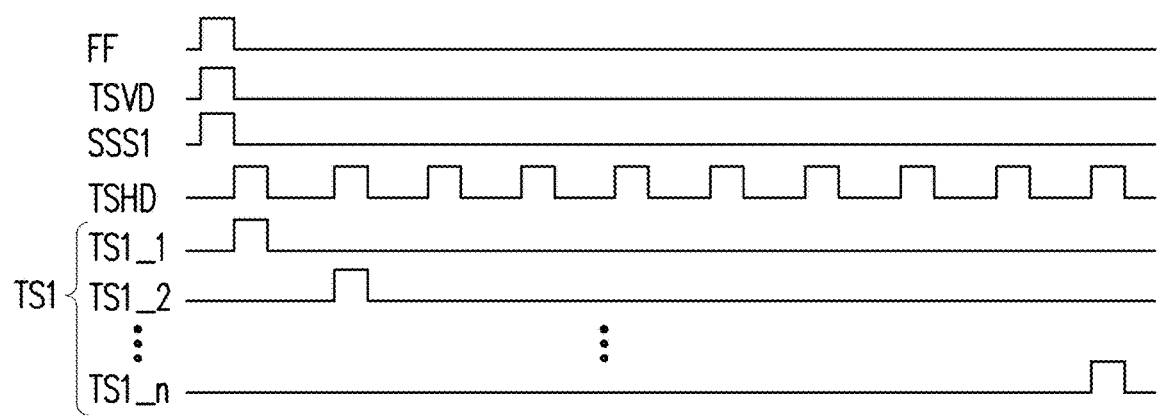
FIG. 2 is a schematic timing diagram illustrating the signals depicted in FIG. 1.

FIG. 2 is a schematic timing diagram illustrating the signals depicted in FIG. 1. The lateral axis illustrated in FIG. 2 represents the time. Referring to FIG. 1 and FIG. 2, the processing circuit 130 may include micro control units (MCUs) and (or) other processing circuits. The processing circuit 130 may execute an algorithm to process the touch detection data TDD, so as to acquire a position of a touched event on the touch panel 110. A flag signal FF output by the processing circuit 130 may indicate whether the execution of the algorithm is completed. For example, when the execution of the algorithm is completed, the processing circuit 130 sets the flag signal FF to a first logic level (e.g., a high logic level); otherwise, the processing circuit 130 sets the flag signal FF to a second logic level (e.g., a low logic level). In other embodiments, the flag signal FF having the low logic level may indicate that "the execution of the algorithm is completed", while the flag signal FF having the high logic level may indicate that "the execution of the algorithm is not yet completed".

A display driving circuit 140 includes a timing controller and (or) other driving circuits. The display driving circuit 140 may control (or drive) the touch display panel 110 to display one or a plurality of image frames. Based on a display driving operation on the touch display panel 110, the display driving circuit 140 may correspondingly output a touch frame synchronization signal TSVD and a touch column synchronization signal TSHD.

A first input terminal of an AND gate 150 is coupled to the processing circuit 130 to receive the flag signal FF. A second input terminal of the AND gate 150 is coupled to the display driving circuit 140 to receive the touch frame synchronization signal TSVD. An output terminal of the AND gate 150 outputs a scan start signal SSS1 to a touch scan circuit 160. The touch scan circuit 160 is coupled to the AND gate 150 to receive the scan start signal SSS1. The touch scan circuit 160 is coupled to the display driving circuit 140 to receive the touch column synchronization signal TSHD. The touch scan circuit 160 may generate a plurality of touch scan signals TS1 according to the scan start signal SSS1 and the touch column synchronization signal TSHD. For example, the touch scan signals TS1 may include touch scan signal TS_1, touch scan signal TS_2, . . . and touch scan signal TS_n.

Figure 3:
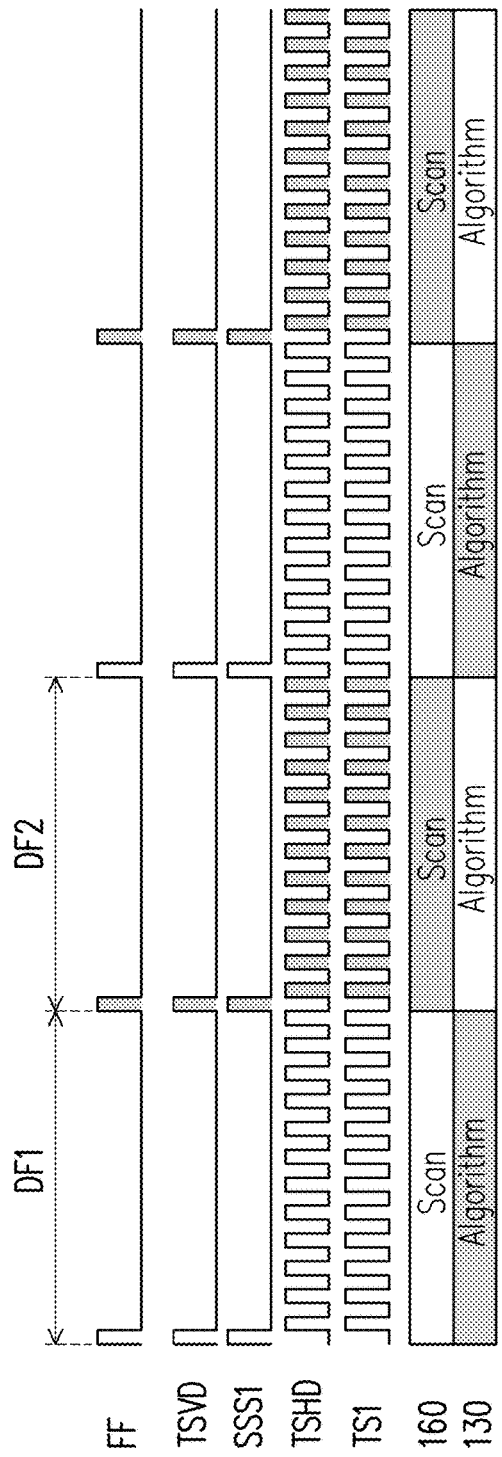
FIG. 3 is a schematic timing diagram illustrating the signals depicted in FIG. 1 in a normal operation condition.

FIG. 3 is a schematic timing diagram illustrating the signals depicted in FIG. 1 in a normal operation condition. The lateral axis illustrated in FIG. 3 represents the time. Referring to FIG. 1 and FIG. 3, a flag signal FF, a touch frame synchronization signal TSVD, a scan start signal SSS1, a touch column synchronization signal TSHD and the touch scan signals TS1 illustrated in FIG. 3 may refer to the descriptions related to those illustrated in FIG. 2, while the flag signal FF, the touch frame synchronization signal TSVD, the scan start signal SSS1, the touch column synchronization signal TSHD and the touch scan signals TS1 illustrated in FIG. 2 may also refer to the descriptions related to those illustrated in FIG. 3. The touch frame synchronization signal TSVD may define a plurality of display frame periods, for example, display frame periods DF1 and DF2. The touch column synchronization signal TSHD may define a plurality of touch column periods in a display frame period.

In the normal operation condition, the touch scan circuit 160 may perform touch scanning on a touch frame during a display frame period. For example, the touch scan circuit 160 may perform the touch scanning on a first touch frame during the display frame period DF1 and then, output touch detection data TDD corresponding to the first touch frame to the processing circuit 130. During the display frame period DF2 following the display frame period DF1, the processing circuit 130 may execute the algorithm to process the touch detection data TDD of the first touch frame, and the touch scan circuit 160 may perform the touch scanning on a next touch frame (e.g., a second touch frame).

Figure 4:
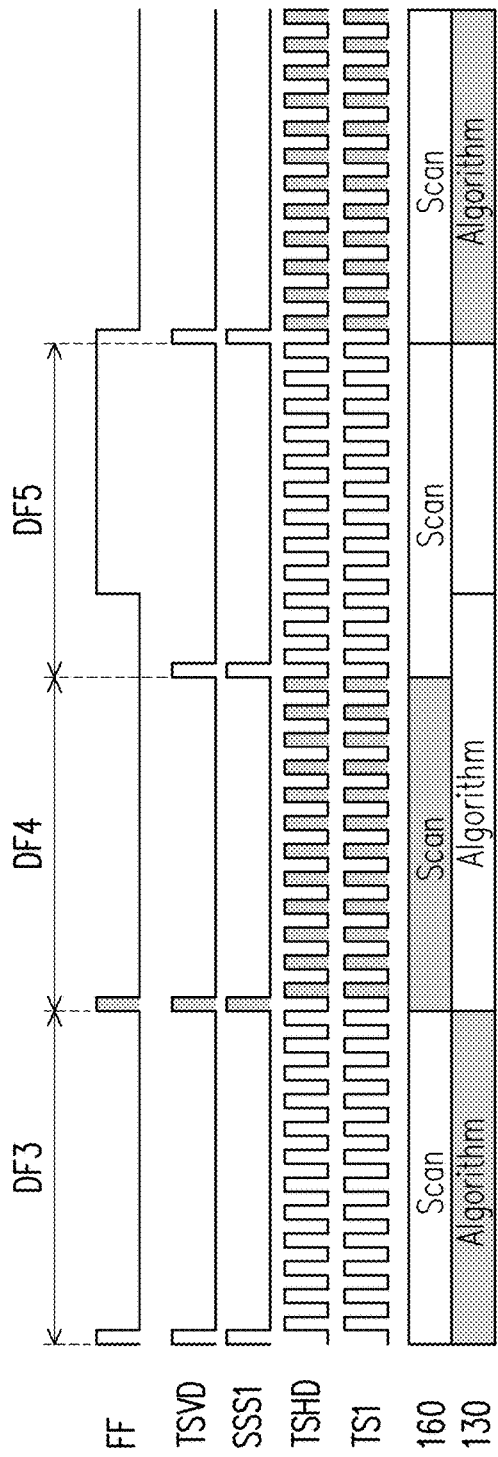
FIG. 4 is a schematic timing diagram illustrating the signals depicted in FIG. 1 in a special operation condition.

In a special operation condition, the algorithm executed by the processing circuit 130 may likely be incapable of completing the processing of the touch detection data TDD of one touch frame in time within one display frame period. For example, FIG. 4 is a schematic timing diagram illustrating the signals depicted in FIG. 1 in a special operation condition. The lateral axis illustrated in FIG. 4 represents the time. A flag signal FF, a touch frame synchronization signal TSVD, a scan start signal SSS1, a touch column synchronization signal TSHD and touch scan signals TS1 illustrated in FIG. 4 may refer to the descriptions related to those illustrated in FIG. 3, while the flag signal FF, the touch frame synchronization signal TSVD, the scan start signal SSS1, the touch column synchronization signal TSHD and the touch scan signals TS1 illustrated in FIG. 3 may also refer to the descriptions related to those illustrated in FIG. 4. Referring to FIG. 1 and FIG. 4, the algorithm executed by the processing circuit 130 may likely be incapable of completing the processing of the touch detection data TDD of a display frame period DF3 in time within a display frame period DF4 illustrated in FIG. 4. Thus, the algorithm needs to take a part of time of a display frame period DF5 to complete the processing of the touch detection data TDD of the display frame period DF3. In this way, the touch scan circuit 160 is idled (stopped from performing the touch scanning) during the display frame period DF5 for the algorithm executed by the processing circuit 130 to complete the processing of the touch detection data TDD of the display frame period DF3. "The touch scan circuit 160 that is idled (stopped from performing the touch scanning) during the display frame period DF5 may cause reduction of a report rate of touched positions for the processing circuit 130. The reduction of the report rate is easily reflected in user experience.

Moreover, in the embodiment illustrated in FIG. 1, the scan start signal SSS1 is dependent on (synchronous with) the touch frame synchronization signal TSVD. Namely, a start time of a touch frame is a start time of a display frame period. Such implementation results in reduction of application flexibility.

Figure 5:
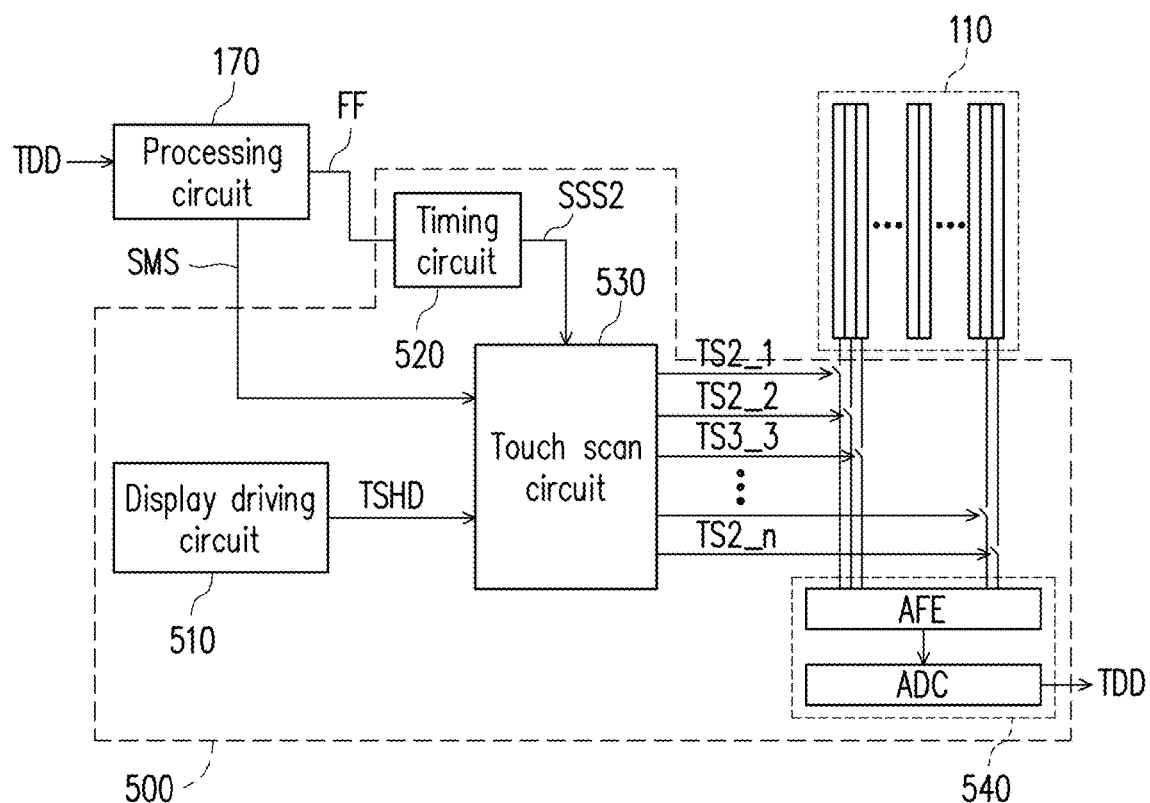
FIG. 5 is a schematic circuit block diagram illustrating a display apparatus according to an embodiment of the invention.

FIG. 5 is a schematic circuit block diagram illustrating a display apparatus according to an embodiment of the invention. The display device illustrated in FIG. 5 includes a processing circuit 170, an electronic circuit and a touch display panel 110. In some other embodiments, based on a design requirement, the electronic circuit includes a touch display driving integrated (TDDI) chip 500 and/or other circuit. The touch panel 110 may be any display panel with a touch function, e.g., a conventional touch display panel or any other touch display panel. The touch display panel 110 illustrated in FIG. 5 may be inferred with reference to the description related to the touch display panel 110 illustrated in FIG. 1 and thus, will not be repeated.

The TDDI chip 500 illustrated in FIG. 5 includes a display driving circuit 510, a timing circuit 520, a touch scan circuit 530 and a reading circuit 540. The reading circuit 540 can be coupled to a plurality of touch sensing columns (e.g., touch detection electrode columns) of the touch display panel 110 through a plurality of switches. Generally, the reading circuit 540 may include an analog front end (AFE) circuit, an analogue-to-digital converter (ADC) and (or) other circuits. Based on a scan operation of the switches, the reading circuit 540 may read a touch detection result of the touch display panel 110 and output touch detection data TDD corresponding to the touch detection result to the processing circuit 170. The reading circuit 540 and the processing circuit 170 illustrated in FIG. 5 may be inferred with reference to the descriptions related to the reading circuit 120 and the processing circuit 130 illustrated in FIG. 1 and thus, will not be repeated hereinafter.

Figure 6:
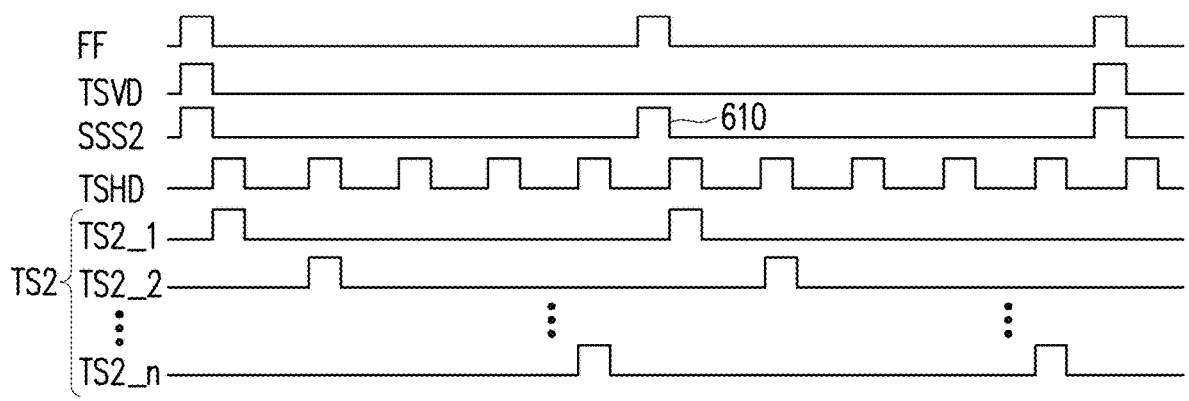
FIG. 6 is a schematic timing diagram of signals of the circuits depicted in FIG. 5 according to an embodiment of the invention.

FIG. 6 is a schematic timing diagram of a plurality of signals for a display apparatus according to an embodiment of the invention. The signals described using the circuits depicted in FIG. 5 for purpose of explanation but are not limited thereto. The lateral axis illustrated in FIG. 6 represents the time. Referring to FIG. 5 and FIG. 6, the processing circuit 170 may execute an algorithm to process the touch detection data TDD, so as to acquire a position of a touched event on the touch panel 110. A flag signal FF output by the processing circuit 170 may indicate whether the execution of the algorithm by the processing circuit 170 is completed. For example, when the execution of the algorithm is completed, the processing circuit 170 sets the flag signal FF to a first logic level (e.g., a high logic level); otherwise, the processing circuit 170 sets the flag signal FF to a second logic level (e.g., a low logic level). In other embodiments, the flag signal FF having the low logic level may indicate that "the execution of the algorithm is completed", while the flag signal FF having the high logic level may indicate that "the execution of the algorithm is not yet completed". During two neighboring pulses of a touch frame synchronization signal TSVD, the touch scan circuit 530 may start the touch frame period according to a scan start signal SSS2 immediately after the execution of the algorithm by the processing circuit 170 is completed. Accordingly, a punish time which is a window period generated in performing synchronous touch scanning can be reduced.

The display driving circuit 510 includes a timing controller and (or) other driving circuits. The display driving circuit 510 may control (or drive) the touch display panel 110 according to a display frame frequency to display one or a plurality of image frames or video frames. Based on a display driving operation on the touch display panel 110, the display driving circuit 510 may correspondingly output a touch column synchronization signal TSHD. The display driving circuit 510 illustrated in FIG. 5 may be inferred with reference to the description related to the display driving circuit 140 and thus, will not be repeated.

A touch frame synchronization signal TSVD and a touch column synchronization signal TSHD illustrated in FIG. 6 may refer to the descriptions related to the touch frame synchronization signal TSVD and the touch column synchronization signal TSHD illustrated in FIG. 2 and thus, will not be repeated hereinafter. The touch frame synchronization signal TSVD illustrated in FIG. 6 is a period (a time length) for presenting "a display frame". In some embodiments, the display driving circuit 510 may not have to output (generate) the touch frame synchronization signal TSVD. In some other embodiments, based on a design requirement, the display driving circuit 510 may output the touch frame synchronization signal TSVD to other circuits that are not illustrated in FIG. 5. In anyway, the display driving circuit 510 does not need to always output the touch frame synchronization signal TSVD to the timing circuit 520. Namely, the operation of the timing circuit 520 is capable of being completely or incompletely unrelated to (independent of) the touch frame synchronization signal TSVD.

The timing circuit 520 may be coupled to the processing circuit 170 to receive the flag signal FF. The timing circuit 520 may generate the scan start signal SSS2 to the touch scan circuit 530 according to the flag signal FF, regardless of the touch frame synchronization signal TSVD. In some embodiments, when the display frame frequency (a frequency of the touch frame synchronization signal TSVD) is fixed (unchanged), the timing circuit 520 may change (adjust) a frequency of the scan start signal SSS2 according to the flag signal FF to change a touch frame frequency. A touch frame period may be defined by two neighboring pulses of the scan start signal SSS2. Either one or both of "a start time of the touch frame period" and "a time length of the touch frame period" may be are dynamically varied according to the flag signal FF.

The implementation manner of the timing circuit 520 is not limited in the invention. For example, based on a design requirement, the timing circuit 520 may include a delay circuit (not shown). The delaying circuit may receive the flag signal FF from the processing circuit 170, and delay the flag signal FF by a delay time to generate the scan start signal SSS2. In some embodiments, the touch scan circuit 530 may stop generating touch scan signals TS2 within the delay time. In some other embodiments, the timing circuit 520 may dynamically change the delay time to change a frequency of the touch frame period.

The touch scan circuit 530 is coupled to the timing circuit 520 to receive the scan start signal SSS2. The touch scan circuit 530 may perform touch scanning according to the scan start signal SSS2. The touch scan circuit 530 may determine a start time of a touch frame period according to a pulse of the scan start signal SSS2, and (or) determine the touch frame frequency according to the scan start signal SSS2. For example, a touch frame period may be defined by two neighboring pulses of the scan start signal SSS2. In the embodiment illustrated in FIG. 6, the scan start signal SSS2 includes at least one pulse 610 between the two neighboring pulses of the touch frame synchronization signal TSVD generated by the display driving circuit 510. Based on a design requirement, the scan start signal SSS2 may be asynchronous or delayed with respect to the touch frame synchronization signal TSVD generated by the display driving circuit 510. This includes implementations that the scan start signal SSS2 is but not always synchronous with the touch frame synchronization signal TSVD.

The touch scan circuit 530 is coupled to the display driving circuit 510 to receive the touch column synchronization signal TSHD. The touch scan circuit 530 may generate a plurality of touch scan signals TS2 according to the scan start signal SSS2 and the touch column synchronization signal TSHD. For example, the touch scan signals TS2 may include a touch scan signal TS2_1, a touch scan signal TS2_2, . . . and a touch scan signal TS2_n. The touch scan circuit 530 may determine the start time of the touch frame period according to the pulse of the scan start signal SSS2. In some embodiments, the scan start signal SSS2 may be asynchronous or delayed with respect to the touch frame synchronization signal TSVD generated by the display driving circuit 510. The scan start signal SSS2, asynchronous with the touch frame synchronization signal TSVD, can include at least one pulse occurring between the two neighboring pulses of the touch frame synchronization signal TSVD generated by the display driving circuit 510. It is noted that the definition of being asynchronous with the touch frame synchronization signal TSVD includes implementations wherein the scan start signal SSS2 is still synchronous with the touch frame synchronization signal TSVD for at least a period of time but not always synchronous with the touch frame synchronization signal TSVD.

The touch scan circuit 530 may determine a plurality of touch column periods within a touch frame period according to a plurality of pulses of the touch column synchronization signal TSHD to, for example, determine timings of the touch scan signals TS2_1 to TS2_n. The touch scan signals TS2_1 to TS2_n may be used to control a plurality of switches between the touch display panel 110 and the reading circuit 540 to perform the touch scan operation. Thus, the touch scan circuit 530 may perform the touch scanning on one or more touch sensing columns of the touch display panel 110 during each of the pulses of the touch column synchronization signal TSHD. In some conditions, the touch scan circuit 530 may perform the touch scanning a single one touch sensing column of the touch display panel 110 during each of the pulses of the touch column synchronization signal TSHD. In some other conditions, the touch scan circuit 530 may perform the touch scanning plural touch sensing columns of the touch display panel 110 during each of the pulses of the touch column synchronization signal TSHD.

Figure 7:
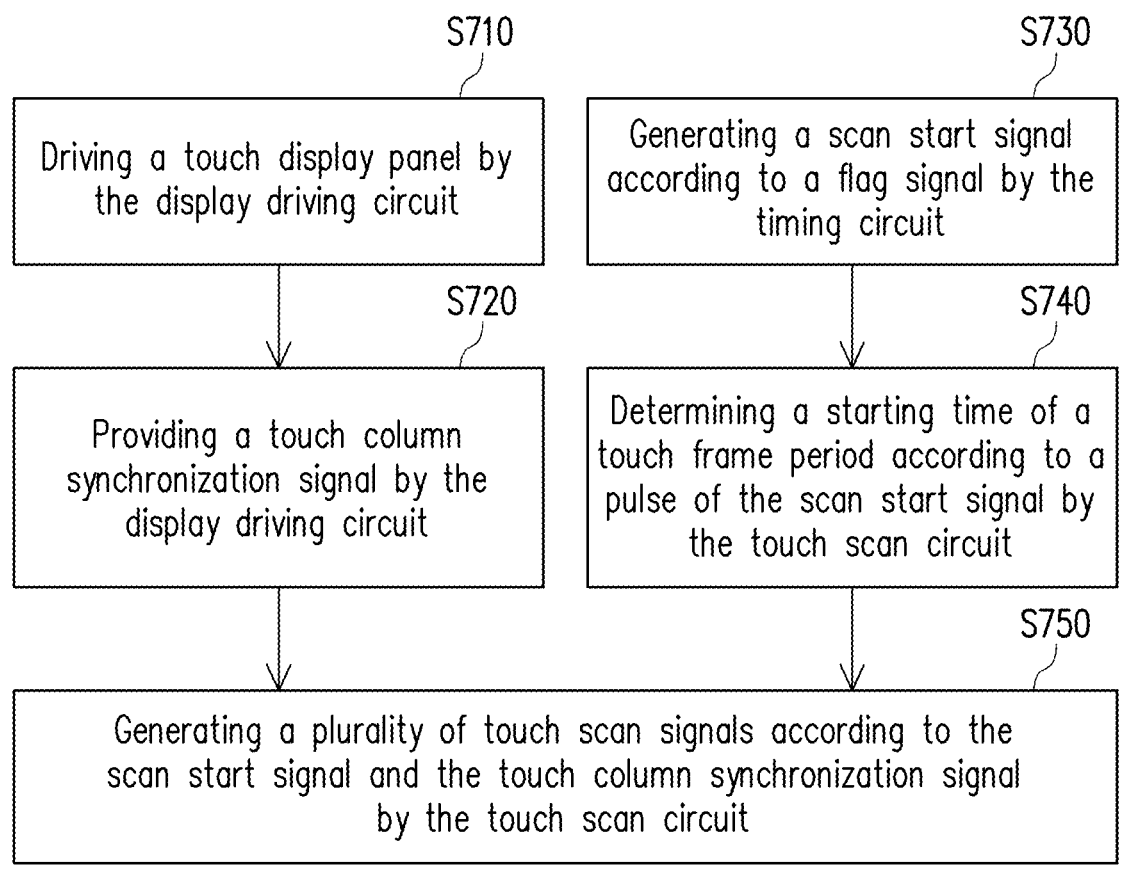
FIG. 7 is a flowchart illustrating an operation method of the touch display driving integrated (TDDI) chip depicted in FIG. 5 according to an embodiment of the invention.

FIG. 7 is a flowchart illustrating an operation method of a TDDI chip according to an embodiment of the invention. The flow chart may be applied to the TDDI chip 500 depicted in FIG. 5 but is not limited thereto. Referring to FIG. 5 and FIG. 7, in step S710, the driving circuit 510 may drive the display panel 110 to display an image. Based on the display driving operation performed on the touch display panel 110 by the display driving circuit 510, the display driving circuit 510 may provide the touch frame synchronization signal TSVD to the touch scan circuit 530 (step S720).

The timing circuit 520 may receive the flag signal FF from the processing circuit 170. In step S730, the timing circuit 520 may generate the scan start signal SSS2 to the touch scan circuit 530 according to the flag signal FF. The scan start signal SSS2, asynchronous with the touch frame synchronization signal TSVD, can include at least one pulse 610 occurring between two neighboring pulses of the touch frame synchronization signal TSVD generated by the display driving circuit 510. In step S740, the touch scan circuit 530 may determine a start time of a touch frame period according to the pulse of the scan start signal SSS2. In step S750, the touch scan circuit 530 may generate the plurality of touch scan signals TS2 (i.e., the touch scan signals TS2_1 to TS2_n) according to the scan start signal SSS2 and the touch column synchronization signal TSHD.

In some embodiments, a frequency of touch scanning can be increased. For example, the scan start signal can be arranged to have a frequency that is an integer multiple of the frequency of touch frame synchronization signal TSVD. Alternatively, the scan start signal can be arranged to have a frequency that is a non-integer multiple of the frequency of the touch frame synchronization signal TSVD. In other words, various combinations frequencies for the scan start signal can be arranged according to any requirements.

Figure 8:
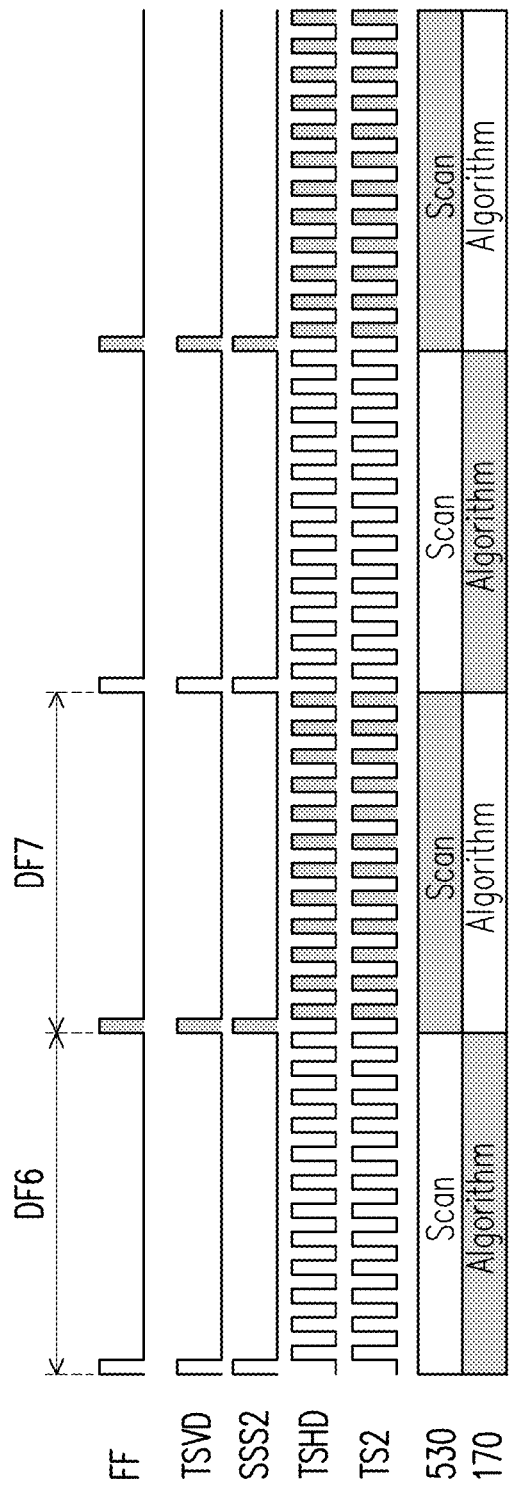
FIG. 8 is a schematic timing diagram of the signals of the circuits depicted in FIG. 5 in a normal operation condition according to an embodiment of the invention.

FIG. 8 is a schematic timing diagram of a plurality of signals in a normal operation condition according to an embodiment of the invention. The signals may be generated by the circuits depicted in FIG. 5 but are not limited thereto. The lateral axis illustrated in FIG. 8 represents the time. Referring to FIG. 5 and FIG. 8, a flag signal FF, a touch frame synchronization signal TSVD, a scan start signal SSS2, a touch column synchronization signal TSHD and touch scan signals TS1 illustrated in FIG. 8 may refer to the descriptions related to those illustrated in FIG. 6, while the flag signal FF, the touch frame synchronization signal TSVD, the scan start signal SSS1, the touch column synchronization signal TSHD and the touch scan signals TS1 illustrated in FIG. 6 may also refer to the descriptions related to those illustrated in FIG. 8. The touch frame synchronization signal TSVD may define a plurality of display frame periods, for example, display frame periods DF6 and D7. The touch column synchronization signal TSHD may define a plurality of touch column periods in a display frame period.

In the embodiment illustrated in FIG. 8, the frequency of the scan start signal SSS2 is equal to the frequency of the touch frame synchronization signal TSVD, and a plurality of pulses of the scan start signal SSS2 occur at different times of a plurality of pulses of the touch frame synchronization signal TSVD. In the normal operation condition, the touch scan circuit 530 may perform the touch scanning on a touch frame during a display frame period. For example, the touch scan circuit 530 may perform the touch scanning on a first touch frame during the display frame period DF6 and then, output the touch detection data TDD corresponding to the first touch frame to the processing circuit 170. During the display frame period DF7 following the display frame period DF6, the processing circuit 170 may execute the algorithm to process the touch detection data TDD of the first touch frame, and the touch scan circuit 530 may perform the touch scanning on a next touch frame (e.g., a second touch frame).

Figure 9:
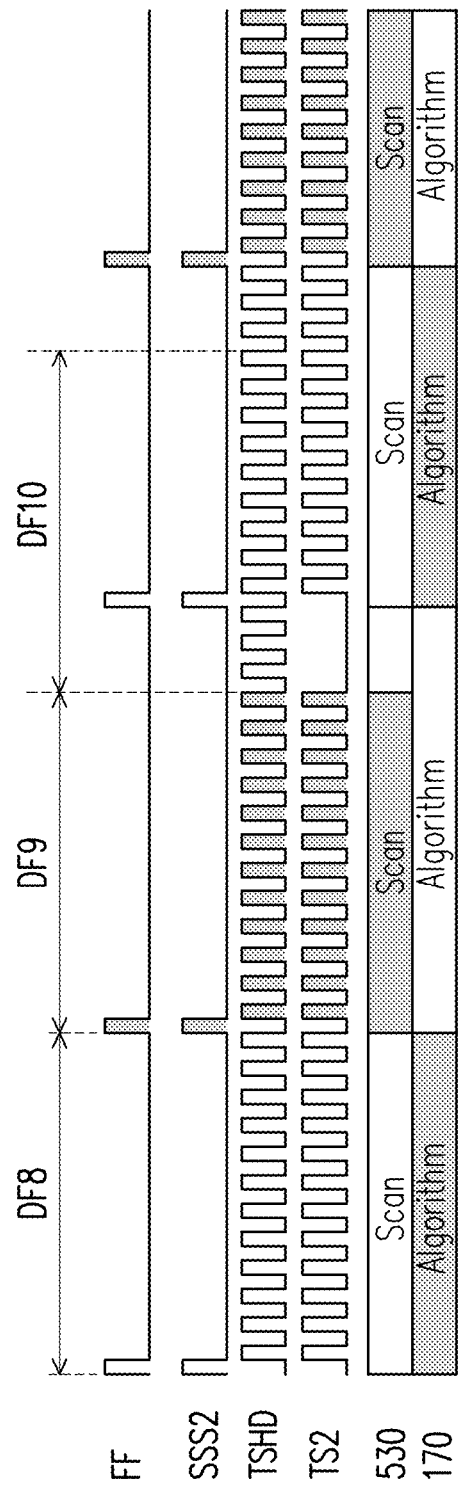
FIG. 9 is a schematic timing diagram of the signals of the circuits depicted in FIG. 5 in a special operation condition according to an embodiment of the invention.

In a special operation condition, the algorithm executed by the processing circuit 170 may likely be incapable of completing the processing of the touch detection data TDD of one touch frame in time within one display frame period. For example, FIG. 9 is a schematic timing diagram of the signals of the circuits depicted in FIG. 5 in a special operation condition according to an embodiment of the invention. The lateral axis illustrated in FIG. 9 represents the time. A flag signal FF, a scan start signal SSS2, a touch column synchronization signal TSHD and touch scan signals TS2 illustrated in FIG. 9 may refer to the descriptions related to those illustrated in FIG. 8, while the flag signal FF, the scan start signal SSS2, the touch column synchronization signal TSHD and the touch scan signals TS2 illustrated in FIG. 8 may also refer to the descriptions related to those illustrated in FIG. 9. Referring to FIG. 5 and FIG. 9, the frequency of the scan start signal SSS2 is equal to the frequency of the touch frame synchronization signal TSVD, and a plurality of pulses of the scan start signal SSS2 occur at different times of a plurality of pulses of the touch frame synchronization signal TSVD.

In the embodiment illustrated in FIG. 9, the algorithm executed by the processing circuit 170 may likely be incapable of completing the processing of the touch detection data TDD of a display frame period DF8 in time within a display frame period DF9 illustrated in FIG. 9. Thus, the algorithm needs to take a part of time of a display frame period DF10 to complete the processing of the touch detection data TDD of the display frame period DF8. The scan start signal SSS2 may be related to (dependent on) an execution state (i.e., the flag signal FF) of the algorithm executed by the processing circuit 170. However, the scan start signal SSS2 may be unrelated to (independent of) the display frame period (i.e., the touch frame synchronization signal TSVD). Thus, when the processing of the touch detection data TDD of the display frame period DF8 is completed by the algorithm executed by the processing circuit 170 which generates the flag signal to inform the timing circuit 520 of the completion, the timing circuit 520 can immediately generate the scan start signal SSS2 which can immediately trigger the display driving circuit 530 to start of a next touch frame for performing touch scanning on even in the middle of the display frame period DF10, without waiting for the end of the display frame period DF10. Thus, compared to FIG. 4 the touch scanning cannot be immediately started in a middle of a display frame period, a time length of a period that the touch scan circuit 530 is idled may be shortened as much as possible.

FIG. 10 is a schematic timing diagram of signals in a condition of performing special scanning according to an embodiment of the invention. The signal may be generated by the circuits depicted in FIG. 5 but not limited thereto. The lateral axis illustrated in FIG. 10 represents the time. A flag signal FF, a scan start signal SSS2, a touch column synchronization signal TSHD and touch scan signals TS2 illustrated in FIG. 10 may refer to the descriptions related to those illustrated in FIG. 6, FIG. 8 and (or) FIG. 9. Referring to FIG. 5 and FIG. 10, based on a design requirement, the TDDI chip 500 may also reduce a touch report delay as much as possible in the presence of a mixed special mode. Based on a design requirement, the aforementioned special mode may be a frequency hopping mode, a waterproof mode, a glove detect mode or other non-normal modes. The TDDI chip 500 may perform special scanning in the special mode and perform normal scanning in the normal mode. Usually, a time length of a touch frame of the special scanning is greater than a time length of a touch frame of the normal scanning. Even though the time length of the touch frame of the special scanning is different from the time length of the touch frame of the normal scanning, the scan start signal SSS2 may immediately trigger the display driving circuit 530 to perform the touch scanning (e.g., the normal scanning) on the next touch frame, without waiting for the end of one display frame period. In this way, the time length of the period that the touch scan circuit 530 is idled (stopped from performing the touch scanning) may be shortened as much as possible.

In some embodiments, the touch frame period is started at a mode transition time occurring between two neighboring pulses of the touch frame synchronization signal TSVD, wherein the mode transition time is a transition time from the special mode to the normal mode. In the special mode, a touch function may be disabled. In the normal mode, the touch function may be disabled.

Figure 12:
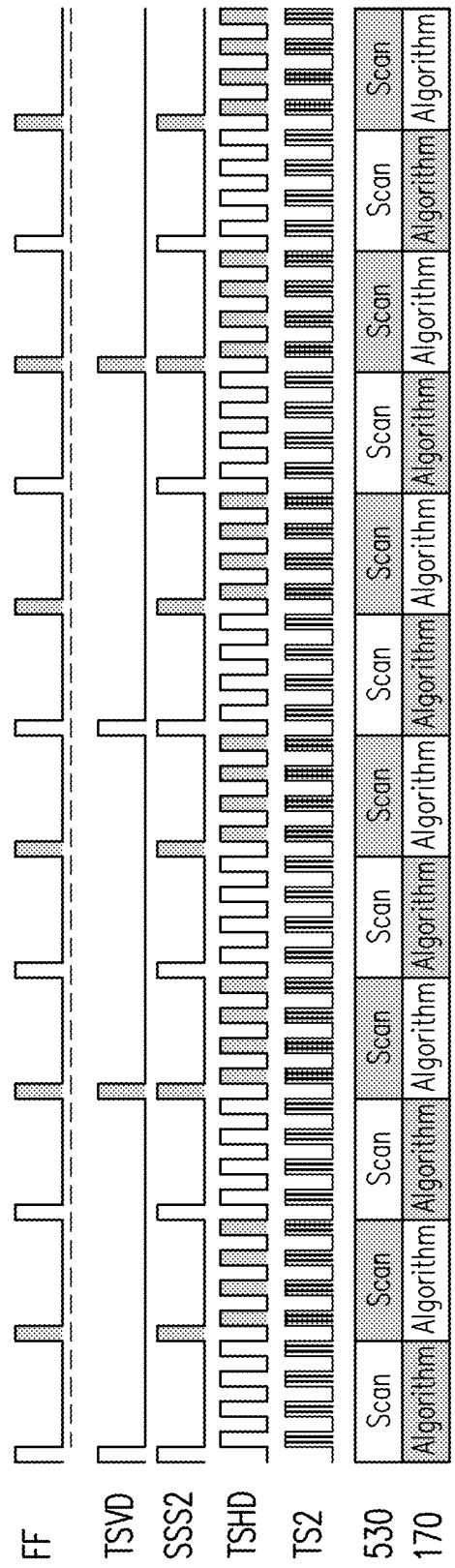
FIG. 12 is a schematic timing diagram of the signals of the circuits depicted in FIG. 5 according to yet another embodiment of the invention.

In some embodiments, the touch scan circuit 330 may scan a plurality of touch sensing columns of the touch display panel 110 during each of the pulses of the touch column synchronization signal TSHD, wherein the number of the touch sensing columns is equal to an integer. For example, FIG. 11 is a schematic timing diagram of the signals of the circuits depicted in FIG. 5 according to another embodiment of the invention. FIG. 12 is a schematic timing diagram of the signals of the circuits depicted in FIG. 5 according to yet another embodiment of the invention. The lateral axes illustrated in FIG. 11 and FIG. 12 represent the time. Flag signals FF, touch frame synchronization signals TSVD, scan start signals SSS2, touch column synchronization signals TSHD and touch scan signals TS2 illustrated in FIG. 11 and FIG. 12 may refer to the descriptions related to those illustrated in FIG. 6 and (or) FIG. 8. The frequency of the scan start signal SSS2 is an integer multiple of the frequency of the touch frame synchronization signal TSVD, so as to accelerate a speed of the touch scanning. For example, FIG. 8 illustrates an example that the frequency of the scan start signal SSS2 is 1 time the frequency of the touch frame synchronization signal TSVD. FIG. 11 illustrates an example that the frequency of the scan start signal SSS2 is 2 times the frequency of the touch frame synchronization signal TSVD. FIG. 12 illustrates an example that the frequency of the scan start signal SSS2 is 3 times the frequency of the touch frame synchronization signal TSVD.

Figure 13:
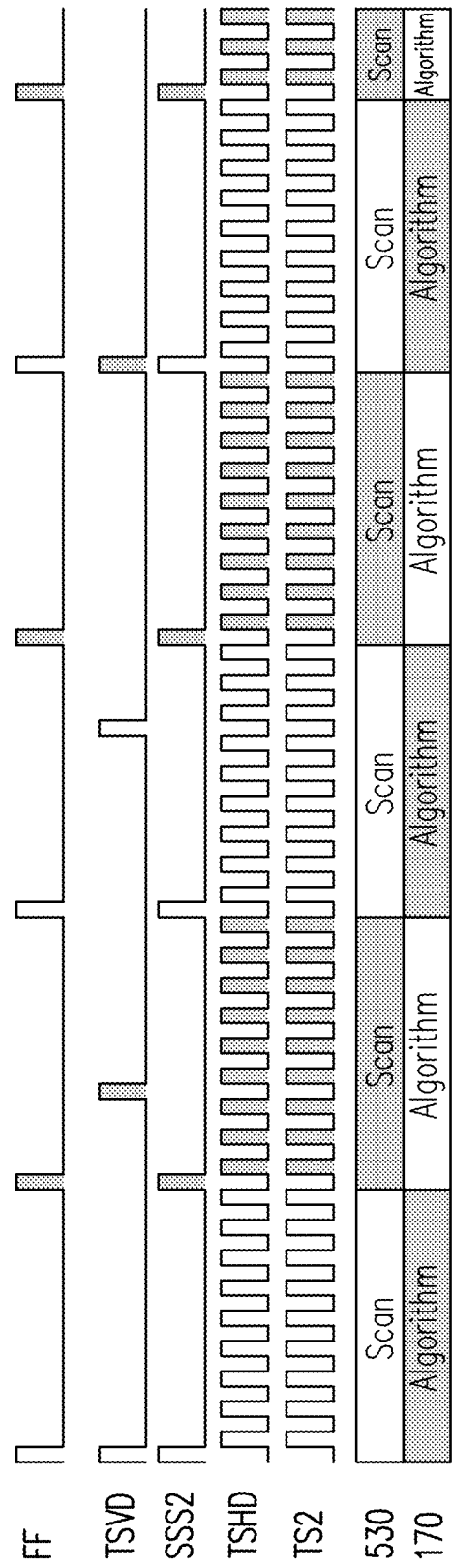
FIG. 13 is a schematic timing diagram of the signals of the circuits depicted in FIG. 5 according to still another embodiment of the invention.

FIG. 13 is a schematic timing diagram of the signals of the circuits depicted in FIG. 5 according to still another embodiment of the invention. The lateral axis illustrated in FIG. 13 represents the time. A flag signal FF, a touch frame synchronization signal TSVD, a scan start signal SSS2, a touch column synchronization signal TSHD and touch scan signals TS2 illustrated in FIG. 13 may refer to the descriptions related to those illustrated in FIG. 6 and (or) FIG. 8. The frequency of the scan start signal SSS2 is a non-integer multiple of the frequency of the touch frame synchronization signal TSVD, so as to accelerate the speed of the touch scanning. For example, FIG. 8 illustrates the example that the frequency of the scan start signal SSS2 is 1 time the frequency of the touch frame synchronization signal TSVD. FIG. 13 illustrates an example that the frequency of the scan start signal SSS2 is 4/3 times the frequency of the touch frame synchronization signal TSVD.

In some embodiments, the touch scanning operation can be arranged to be strengthened for a specific region, for example, according to a currently-touched region. This means that that the number of touch scanning operations for the rest region can be fewer, thus increasing the report rate.

Figure 14:
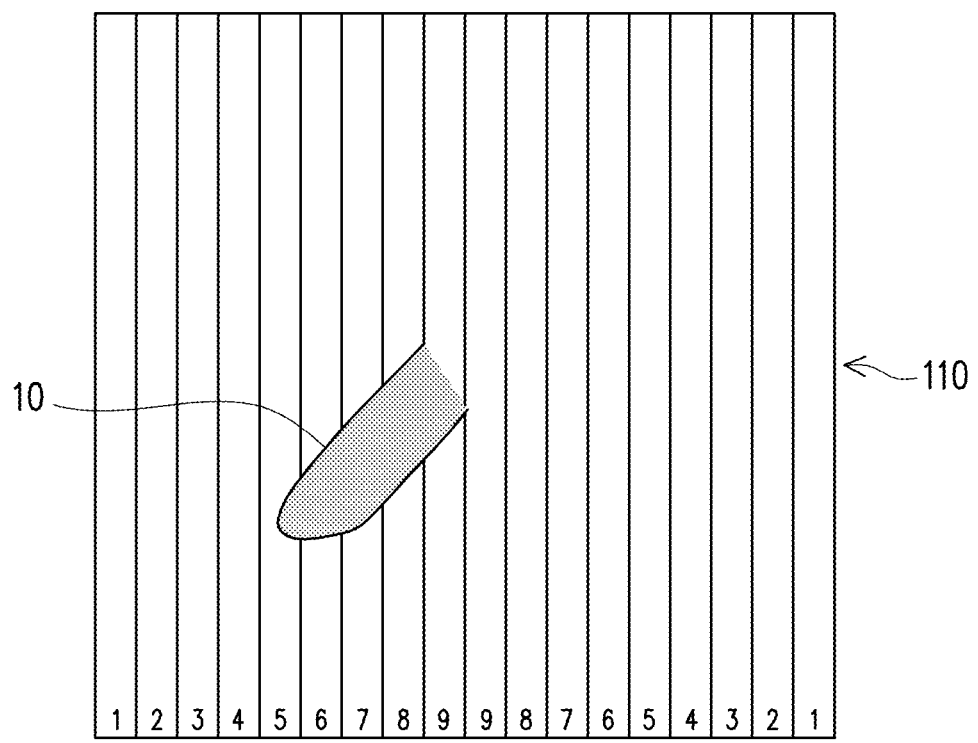
FIG. 14 is a schematic diagram illustrating the touch display panel depicted in FIG. 5 according to an embodiment of the invention.

FIG. 14 is a schematic diagram illustrating a touch sensing operation on a touch display panel according to an embodiment of the invention. The touch display panel may be the touch display panel 110 depicted in FIG. 5 but not limited thereto. The touch display panel 110 illustrated in FIG. 14 has plural e.g., 18 touch sensing columns. Each of the touch sensing columns is labeled with a number. These numbers represent scanning orders according to which a scan operation is performed on the touch sensing columns illustrated in FIG. 14 during a normal operation period. In this case, these numbers are also used as reference symbols of the touch sensing columns illustrated in FIG. 14. In an operational scenario illustrated in FIG. 14, a finger 10 touches the touch sensing columns, 5, 6 and 7 of the touch display panel 110.

Figure 15:
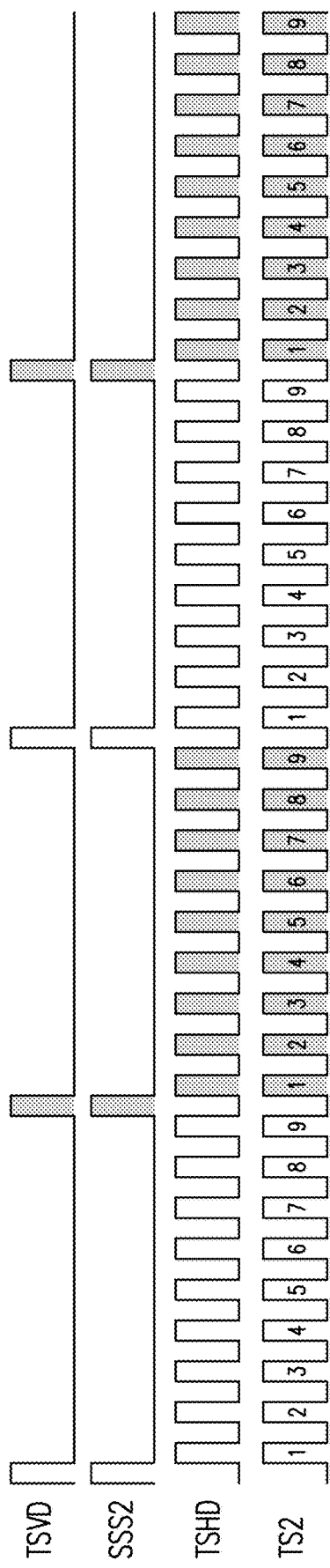
FIG. 15 is a schematic timing diagram of the signals of the circuits depicted in FIG. 5 in the normal operation condition according to an embodiment of the invention.

FIG. 15 is a schematic timing diagram of the signals of the circuits depicted in FIG. 5 in the normal operation condition according to an embodiment of the invention. The lateral axis illustrated in FIG. 15 represents the time. A touch frame synchronization signal TSVD, a scan start signal SSS2, a touch column synchronization signal TSHD and touch scan signals TS2 illustrated in FIG. 15 may refer to the descriptions related to those illustrated in FIG. 6 and (or) FIG. 8. Referring to FIG. 5, FIG. 14 and FIG. 15, during one display frame period, the touch scan circuit 530 may generate the plurality of touch scan signals TS2 to scan the touch sensing columns 1 to 9 of the touch display panel 110.

Figure 16:
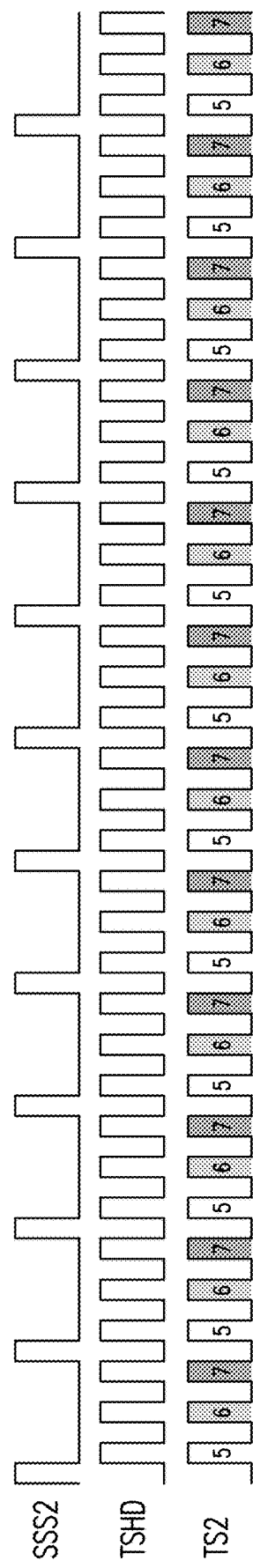
FIG. 16 is a schematic timing diagram of the signals of the circuits depicted in FIG. 5 in a condition of performing accelerated scanning according to an embodiment of the invention.

FIG. 16 is a schematic timing diagram of the signals of the circuits depicted in FIG. 5 in a condition of performing accelerated scanning according to an embodiment of the invention. The lateral axis illustrated in FIG. 16 represents the time. A scan start signal SSS2, a touch column synchronization signal TSHD and touch scan signals TS2 illustrated in FIG. 16 may refer to the descriptions related to those illustrated in FIG. 6, FIG. 8 and (or) FIG. 8. Referring to FIG. 5, FIG. 14 and FIG. 16, a touch frame period may be defined by two neighboring pulses of the scan start signal SSS2. Either one or both of "the start time of the touch frame period" and "the time length of the touch frame period" may be are dynamically varied according to the flag signal FF. In the example illustrated in FIG. 16, an object being scanned may be dynamically adjusted. During a touch frame period determined according to the scan start signal SSS2, the touch scan circuit 530 may merely scan a part of the touch sensing columns 1 to 9 of the touch display panel 110 according to the touch column synchronization signal TSHD. The touch scan circuit 530 may determine the part of the touch sensing columns 1 to 9 of the touch display panel 110 according to a touched area of the touch display panel 110. For example, in case the processing circuit 170 detects a touch event of the finger 10, the processing circuit 170 may control the touch scan circuit 530 according to a control signal SMS, so as to detect the surrounding area of the finger 10 at a high report rate. Namely, in the same way as the embodiments illustrated in FIG. 14 and FIG. 16, the touch scan circuit 530 may merely scan the touch sensing columns 5 to 7, without scanning the other touch sensing columns, so as to accelerate the scanning. A time for scanning other areas of the touch display panel 110 may be reduced, so as to accelerate touch detection.

Figure 17:
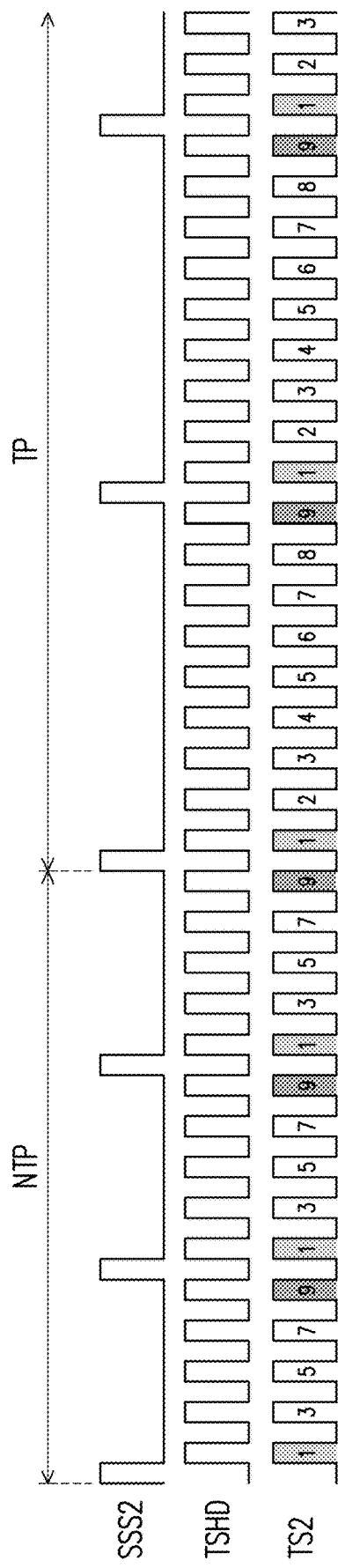
FIG. 17 is a schematic timing diagram of the signals of the circuits depicted in FIG. 5 in a condition of performing the accelerated scanning according to another embodiment of the invention.

FIG. 17 is a schematic timing diagram of the signals of the circuits depicted in FIG. 5 in a condition of performing the accelerated scanning according to another embodiment of the invention. The lateral axis illustrated in FIG. 17 represents the time. A scan start signal SSS2, a touch column synchronization signal TSHD and touch scan signals TS2 illustrated in FIG. 17 may refer to the descriptions related to those illustrated in FIG. 6 and (or) FIG. 8. Referring to FIG. 5, FIG. 14 and FIG. 17, an object being scanned may be dynamically adjusted in the example illustrated in FIG. 17. During one touch frame period determined by the scan start signal SSS2, the touch scan circuit 530 may merely scan a part of the touch sensing columns 1 to 9 of the touch display panel 110 according to the touch column synchronization signal TSHD.

For example, the part of the touch sensing columns of the touch display panel 110 may be one of "a plurality of odd-number-indexed columns" and "a plurality of even-number-indexed columns". The touch scan circuit 530 may scan only the part of the touch sensing columns of the touch display panel 110 during a first touch frame period. In response to the detection of the touch event, the touch scan circuit 530 may scan all of the touch sensing columns of the touch display panel 110 during a second touch frame period. In some embodiments, a length of the second touch frame period is multiple (for example, 2) times a length of the first touch frame period.

For example, in the example illustrated in FIG. 17, when the finger 10 does not touch the touch display panel 110, i.e., during a non-touch period NTP, the touch scan circuit 530 may merely scan odd-numbered columns 1, 3, 5, 7 and 9 among the touch sensing columns 1 to 9, without scanning the other touch sensing columns, so as to accelerate the scanning. In case the processing circuit 170 detects the touch event of the finger 10, i.e., during a touch period TP, the processing circuit 170 may control the touch scan circuit 530 according to the control signal SMS, so as to scan all of the touch sensing columns 1 to 9 of the touch display panel 110.

In some embodiments, the touch frame period may be divided into a first period and a second period. During the first period, the touch scan circuit 530 may generate the plurality of touch scan signals TS2 to perform the touch scanning. During the second period, the touch scan circuit 530 may stop generating the touch scan signals TS2.

Figure 18:
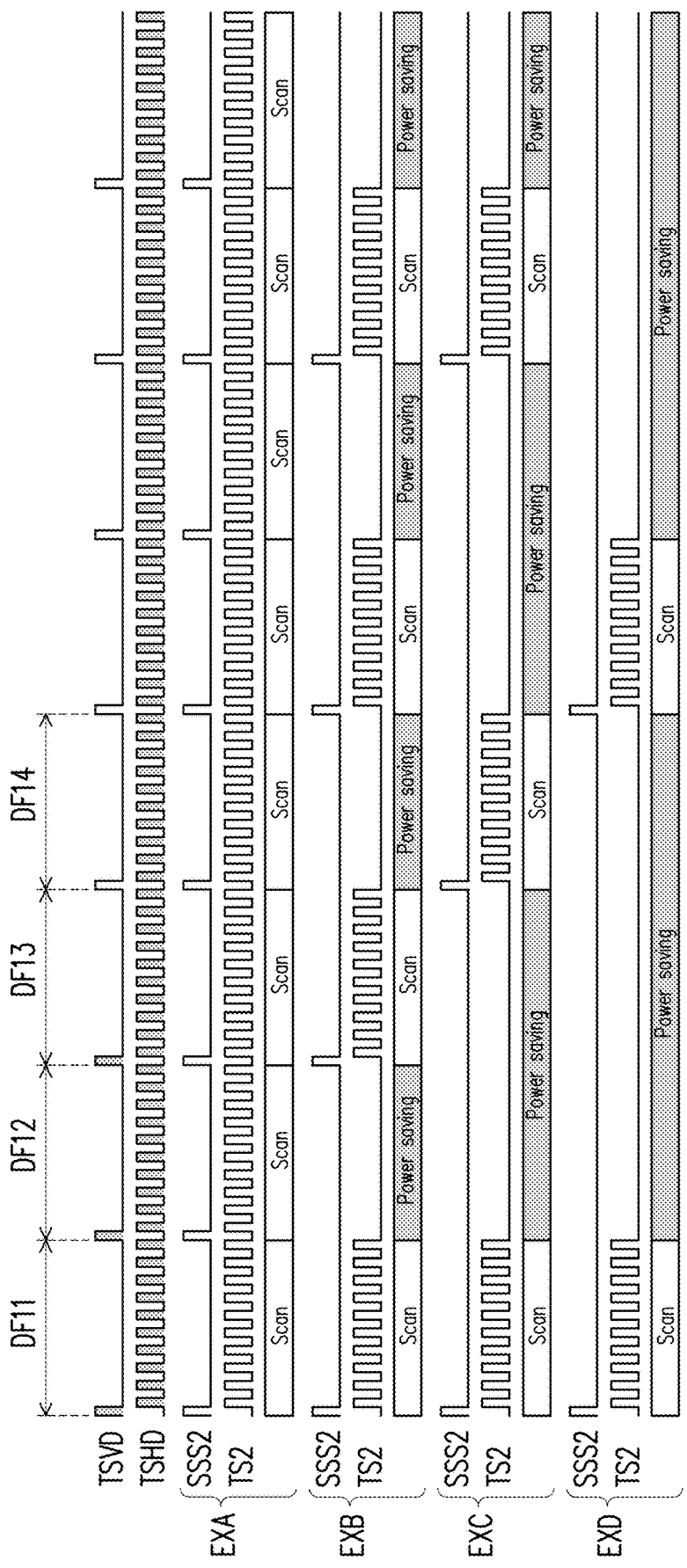
FIG. 18 is a schematic timing diagram of the signals of the circuits depicted in FIG. 5 performing a power-saving operation according to different embodiments of the invention.

For example, FIG. 18 is a schematic timing diagram of a plurality of signals capable of performing a power-saving operation according to different embodiments of the invention. Circuits for generating the signals may be the circuits as depicted in FIG. 5 but not limited thereto The lateral axis illustrated in FIG. 18 represents the time. A touch frame synchronization signal TSVD, a touch column synchronization signal TSHD, a scan start signal SSS2 and touch scan signals TS2 illustrated in FIG. 18 may refer to the descriptions related to those illustrated in FIG. 6 and (or) FIG. 8. Referring to FIG. 5 and FIG. 18, FIG. 18 illustrates 4 embodied examples, EXA, EXB, EXC and EXD. In the first embodied example EXA, the scan start signal SSS2 is synchronous with the frequency of the touch frame synchronization signal TSVD. Namely, the touch scan circuit 530 may perform the touch scanning during each of display frame periods (e.g., DF11, DF12, DF13 and DF14).

In the second embodied example EXB, a touch frame period may be divided into a first period (e.g., the display frame period DF11) and a second period (e.g., the display frame period DF12). During the first period, the touch scan circuit 530 may generate the plurality of touch scan signals TS2 to perform the touch scanning. During the second period, the touch scan circuit 530 may stop generating the touch scan signals TS2.

In the third embodied example EXC, a touch frame period may be divided into a first period (e.g., the display frame period DF11) and a second period (e.g., including the display frame periods DF12 and DF13). During the first period, the touch scan circuit 530 may generate the plurality of touch scan signals TS2 to perform the touch scanning. During the second period, the touch scan circuit 530 may stop generating the touch scan signals TS2.

In the fourth embodied example EXD, a touch frame period may be divided into a first period (e.g., the display frame period DF11) and a second period (e.g., including the display frame periods DF12, DF13 and DF14). During the first period, the touch scan circuit 530 may generate the plurality of touch scan signals TS2 to perform the touch scanning. During the second period, the touch scan circuit 530 may stop generating the touch scan signals TS2.

Figure 19:
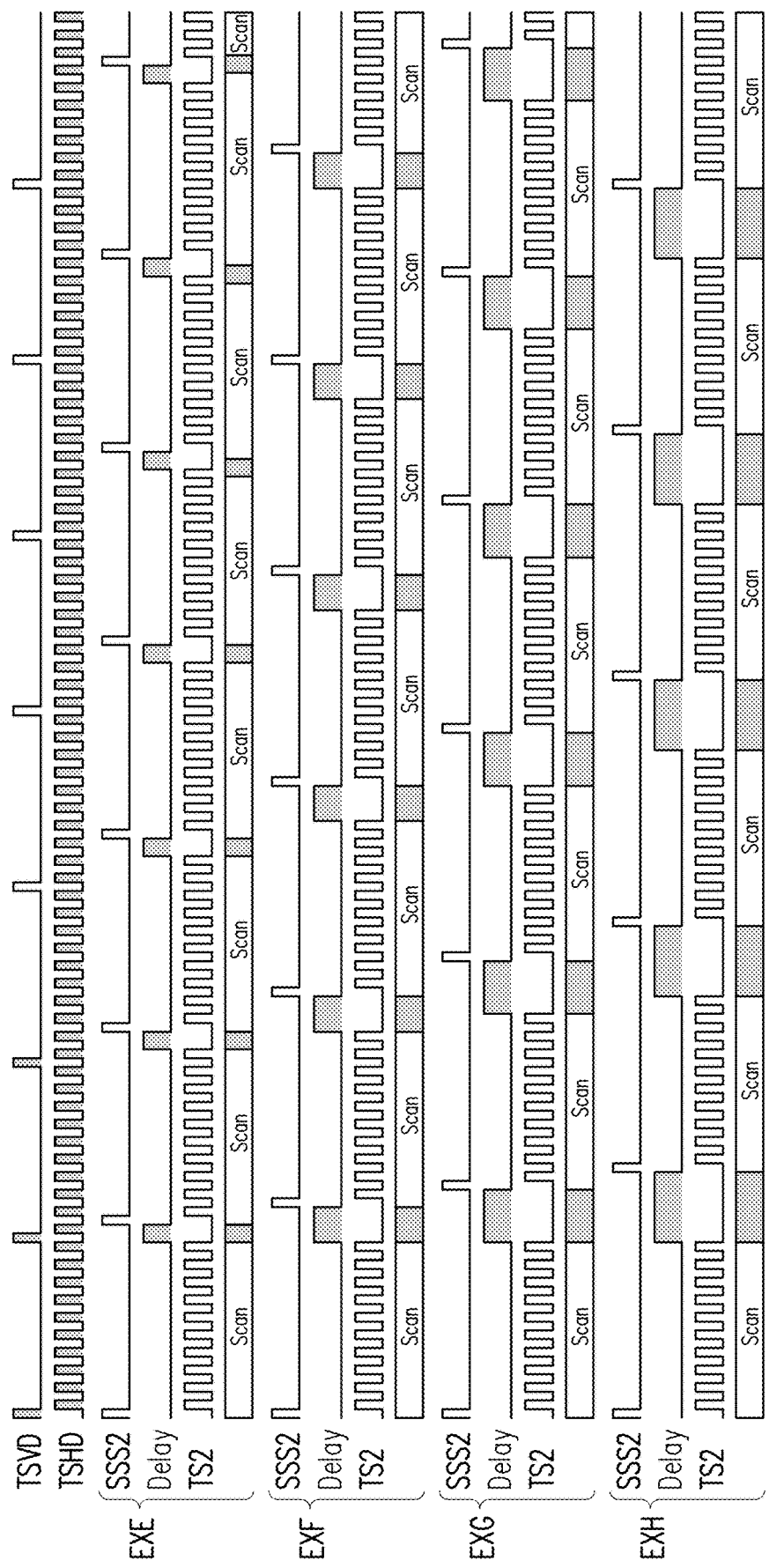
FIG. 19 is a schematic timing diagram of the signals of the circuits depicted in FIG. 5 performing an asynchronous scan operation according to different embodiments of the invention.

In some embodiments, start times and the time lengths of the touch frame periods are not fixed to be the same as a start time and a time length of a period of the touch frame synchronization signal TSVD. FIG. 19 is a schematic timing diagram of the signals of the circuits depicted in FIG. 5 performing an asynchronous scan operation according to different embodiments of the invention. The lateral axis illustrated in FIG. 19 represents the time. A touch frame synchronization signal TSVD, a touch column synchronization signal TSHD, a scan start signal SSS2 and touch scan signals TS2 illustrated in FIG. 19 may refer to the descriptions related to those illustrated in FIG. 6 and (or) FIG. 8. Referring to FIG. 5 and FIG. 19, the timing circuit 520 may add a delay time to the scan start signal SSS2. FIG. 19 illustrates 4 embodied examples, EXE, EXF, EXG and EXH. In these embodied embodiments EXE to EXH, the timing circuit 520 may delay times with different lengths to the scan start signal SSS2. In this way, the touch scan operation may not be synchronous with the touch frame synchronization signal TSVD (i.e., asynchronous with the display frame).

In addition, the report rate has to be stable. In the embodiment that "the touch frame is synchronous with the display frame", when a timing of the touch frame synchronization signal TSVD is changed, a timing of a pulse of the scan start signal SSS2 may also be changed synchronously. When the timing of the pulse of the scan start signal SSS2 is changed, a period (a time length) of a certain touch frame (or some certain touch frames) may likely be too short. A touch frame with a too short period (time length) is incapable of completing the touch scan, and the touch frame incapable of completing the touch scan has to be dropped.

Figure 20:
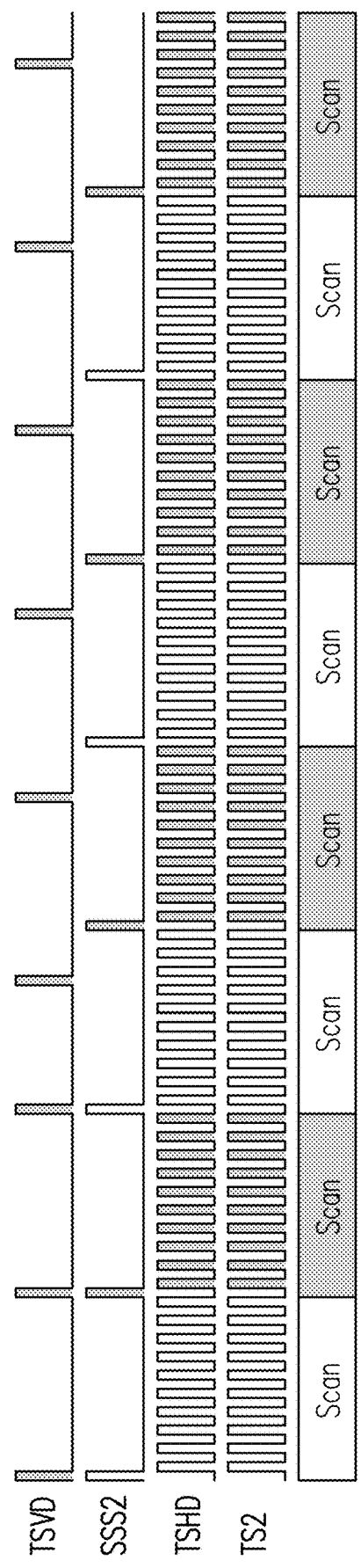
FIG. 20 is a schematic timing diagram of the signals of the circuits depicted in FIG. 5 performing the asynchronous scan operation according to another embodiment of the invention.

FIG. 20 is a schematic timing diagram of a plurality of signals capable of performing the asynchronous scan operation according to another embodiment of the invention. Circuits for generating the signals may be the circuits as depicted in FIG. 5 but not limited thereto. The lateral axis illustrated in FIG. 20 represents the time. A touch frame synchronization signal TSVD, a scan start signal SSS2, a touch column synchronization signal TSHD and touch scan signals TS2 illustrated in FIG. 20 may refer to the descriptions related to those illustrated in FIG. 6 and (or) FIG. 8. Referring to FIG. 5 and FIG. 20, when the frequency of the touch frame synchronization signal TSVD is changed, the frequency of the scan start signal SSS2 is fixed. In this way, the report rate may keep stable.

In the above embodiments, the generation of the touch frame (or the scan start signal SSS2) does not always rely on the touch frame synchronization signal TSVD). In other words, the touch frame (the scan start signal SSS2) is not constrained by the touch frame synchronization signal TSVD. In some embodiments, the touch frame (the scan start signal SSS2) can be asynchronous with the display frame (or the touch frame synchronization signal TSVD). In some embodiments, the touch frame (the scan start signal SSS2) can be delayed with respect to the touch frame synchronization signal TSVD).

In anyway, in some embodiments, the touch frame (the scan start signal SSS2) and the display frame (the touch frame synchronization signal TSVD) may be completely unrelated from each other. In some other embodiments, the touch frame (the scan start signal SSS2) and the display frame (the touch frame synchronization signal TSVD) may be incompletely unrelated from each other. Namely, it is possible for the touch frame (the scan start signal SSS2) and the display frame (the touch frame synchronization signal TSVD) may keep some relevance with each other.

In other words, in some embodiments, the touch frame (the scan start signal SSS2) may be unrelated with the display frame (the touch frame synchronization signal TSVD). In some other embodiments, the touch scan circuit 520 may still receive the touch frame synchronization signal TSVD from the display driving circuit 510, for at least for at least a period of time or in any required conditions. To achieve this, the timing circuit 520 may still generate the scan start signal SSS2 according to the flag signal FF and the touch frame synchronization signal TSVD. The scan start signal SSS2 may be synchronous with the touch frame synchronization signal TSVD for at least a period of time. In some implementations, the frequency of the scan start signal SSS2 is an integer multiple of the frequency of the touch frame synchronization signal TSVD, wherein the integer may be 1 or greater. Moreover, the timing circuit 520 may further generate the scan start signal SSS2 by delaying the touch frame synchronization signal TSVD by a delay time. Accordingly, the frequency of the touch frame synchronization signal may be an integer multiple of a display frame rate of a plurality of video frames. In some other embodiments, during a first period, the touch frame frequency may be a non-integer multiple of the display frame frequency, and during a second period, the touch frame frequency may be an integer multiple of the display frame frequency.

Based on different design demands, the blocks of the processing circuit 170, the TDDI chip 500, the display driving circuit 510, the timing circuit 520, the touch scan circuit 530 and (or) the reading circuit 540 may be implemented in a form of hardware, firmware, software (i.e., programs) or in a combination of many of the aforementioned three forms.

In terms of the hardware form, the blocks of the processing circuit 170, the TDDI chip 500, the display driving circuit 510, the timing circuit 520, the touch scan circuit 530 and (or) the reading circuit 540 may be implemented in a logic circuit on a integrated circuit. Related functions of the processing circuit 170, the TDDI chip 500, the display driving circuit 510, the timing circuit 520, the touch scan circuit 530 and (or) the reading circuit 540 may be implemented in the form of hardware by utilizing hardware description languages (e.g., Verilog HDL or VHDL) or other suitable programming languages. For example, the related functions of the processing circuit 170, the TDDI chip 500, the display driving circuit 510, the timing circuit 520, the touch scan circuit 530 and (or) the reading circuit 540 may be implemented in one or more controllers, micro-controllers, microprocessors, application-specific integrated circuits (ASICs), digital signal processors (DSPs), field programmable gate arrays (FPGAs) and/or various logic blocks, modules and circuits in other processing units.

In terms of the software form and/or the firmware form, the related functions of the processing circuit 170, the TDDI chip 500, the display driving circuit 510, the timing circuit 520, the touch scan circuit 530 and (or) the reading circuit 540 may be implemented as programming codes. For example, the processing circuit 170, the TDDI chip 500, the display driving circuit 510, the timing circuit 520, the touch scan circuit 530 and (or) the reading circuit 540 may be implemented by using general programming languages (e.g., C or C++) or other suitable programming languages. The programming codes may be recorded/stored in recording media, and the aforementioned recording media include, for example, a read only memory (ROM), a storage device and/or a random access memory (RAM). The programming codes may be accessed from the recording medium and executed by a computer, a central processing unit (CPU), a controller, a micro-controller or a microprocessor to accomplish the related functions. As for the recording medium, a "non-transitory computer readable medium", such as a tape, a disk, a card, a semiconductor memory or a programmable logic circuit, may be used. In addition, the programs may be provided to the computer (or the CPU) through any transmission medium (e.g., a communication network or radio waves). The communication network is, for example, the Internet, wired communication, wireless communication or other communication media.

Based on the above, the timing circuit described in the embodiments of the invention can generate the scan start signal according to the flag signal of the processing circuit. Moreover, the scan start signal can be related to (dependent on) the execution state of the algorithm executed by the processing circuit. The scan start signal can be unrelated to (independent of) the touch frame synchronization signal. The touch frame synchronization signal can define a plurality of display frame periods, and the start time of the touch frame period can be determined according to the pulse of the scan start signal. In this way, the embodiments of the invention can render a touch frame asynchronous (unsynchronized) with a display frame period.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A electronic circuit, adapted to drive a display panel comprising touch sensors, comprising:
   a display driving circuit, configured to drive a touch display panel and configured to generate a touch frame synchronization signal;
   a timing circuit, configured to receive a flag signal from a processing circuit and generate a scan start signal according to the flag signal; and
   a touch scan circuit, coupled to the timing circuit to receive the scan start signal, and coupled to the display driving circuit to receive a touch column synchronization signal from the display driving circuit, wherein the touch scan circuit is capable of generating a plurality of touch scan signals during a touch frame period according to the scan start signal and the touch column synchronization signal, wherein the scan start signal is asynchronous or delayed with respect to the touch frame synchronization signal.

2. The electronic circuit according to claim 1, wherein the touch scan circuit is configured to determine a start time of the touch frame period according to a pulse of the scan start signal, and the scan start signal comprises at least one pulse occurring between two neighboring pulses of the touch frame synchronization signal generated by the display driving circuit.

3. The electronic circuit according to claim 1, wherein at least one of a frequency and a start time of the touch frame period is different from a frequency and a start time of the touch frame synchronization signal.

4. The electronic circuit according to claim 1, wherein the timing circuit comprises a delay circuit configured to delay the flag signal by a delay time to generate the scan start signal.

5. The electronic circuit according to claim 4, wherein the touch scan circuit is configured to stop generating the touch scan signals within the delay time.

6. The electronic circuit according to claim 4, wherein the timing circuit is configured to dynamically change the delay time to change a frequency of the touch fame period.

7. The electronic circuit according to claim 1, wherein the flag signal indicates that an algorithm executed by the processing circuit is completed.

8. The electronic circuit according to claim 7, wherein the touch scan circuit is configured to start the touch frame period according to the scan start signal immediately after the algorithm executed by the processing circuit is completed during two neighboring pulses of the touch frame synchronization signal.

9. The electronic circuit according to claim 1, wherein a frequency of the scan start signal is a non-integer multiple of a frequency of the touch frame synchronization signal.

10. The electronic circuit according to claim 1, wherein a frequency of the scan start signal is an integer multiple of a frequency of the touch frame synchronization signal.

11. The electronic circuit according to claim 10, wherein the touch scan circuit is configured to scan a plurality of touch sensing columns of the touch display panel during each pulse period of the touch column synchronization signal, wherein the number of the touch sensing columns is equal to an integer.

12. The electronic circuit according to claim 1, wherein either one or both of the start time and a time length of the touch frame period are dynamically varied according to the flag signal.

13. The electronic circuit according to claim 12, wherein the start time and the time length of the touch frame period are not fixed to be always the same as a start time and a time length of a period of the touch frame synchronization signal.

14. The electronic circuit according to claim 1, wherein a frequency of the scan start signal is fixed when a frequency of the touch frame synchronization signal is changed.

15. The electronic circuit according to claim 1, wherein a frequency of the scan start signal is varied according to the flag signal when a frequency of the touch frame synchronization signal is fixed.

16. The electronic circuit according to claim 1, wherein the touch scan circuit is configured to determine a plurality of touch column periods within the touch frame period according to a plurality of pulses of the touch column synchronization signal.

17. The electronic circuit according to claim 16, wherein the touch scan circuit is configured to perform touch scanning on one or more touch sensing columns of the touch display panel during each of the pulses of the touch column synchronization signal.

18. The electronic circuit according to claim 17, wherein the touch scan circuit is configured to scan a part of the touch sensing columns of the touch display panel during a first touch frame period, and in response to a detection of a touch event, the touch scan circuit is configured to scan all of the touch sensing columns of the touch display panel during a second touch fame period.

19. The electronic circuit according to claim 18, wherein a length of the second touch frame period is multiple times a length of the first touch frame period.

20. The electronic circuit according to claim 1, wherein the touch frame period is started at a mode transition time occurring between two neighboring pulses of the touch frame synchronization signal.

21. The electronic circuit according to claim 20, wherein the mode transition time is a transition time from a special mode to a normal mode, and a touch function is disabled in the special mode and is enabled in the normal mode.

22. The electronic circuit according to claim 1, wherein the touch frame period is divided into a first period and a second period, wherein during the first period, the touch scan circuit is configured to generate the touch scan signals to perform touch scanning, and during the second period, the touch scan circuit is configured to stop generating the touch scan signals.

23. The electronic circuit according to claim 1, wherein the timing circuit is further configured to receive the touch frame synchronization signal from the display driving circuit, and configured to generate the scan start signal according to the flag signal and the touch frame synchronization signal.

24. The electronic circuit according to claim 1, wherein the timing circuit is configured to generate the scan start signal synchronous with the touch frame synchronization signal for at least a period of time.

25. The electronic circuit according to claim 24, wherein a frequency of the scan start signal is an integer multiple of a frequency of the touch frame synchronization signal.

26. The electronic circuit according to claim 24, wherein the timing circuit is configured to generate the scan start signal by delaying the touch frame synchronization signal by a delay time.

27. The electronic circuit according to claim 24, wherein a frequency of the touch frame synchronization signal is an integer multiple of a display frame rate of a plurality of video frames.

28. A electronic circuit, comprising:
a timing circuit, comprising a delay circuit, configured to receive a flag signal from a processing circuit, and configured to generate a scan start signal according to the flag signal; and
a touch scan circuit, coupled to the timing circuit to receive the scan start signal, and configured to generate a plurality of touch scan signals according to the scan start signal,
wherein the touch scan circuit is configured to determine a start time of a touch frame period according to a pulse of the scan start signal, and the scan start signal is asynchronous or delayed with respect to a touch frame synchronization signal generated by the display driving circuit.

29. The electronic circuit according to claim 28, wherein the delay circuit is configured to delay the flag signal by a delay time to generate the scan start signal.

30. A electronic circuit, adapted to drive a display panel comprising touch sensors, comprising:
a display driving circuit, configured to drive a touch display panel according to a display frame frequency to display a plurality of video frames;
a timing circuit, configured to receive a flag signal from a processing circuit and generate a scan start signal according to the flag signal; and
a touch scan circuit, coupled to the timing circuit to receive the scan start signal and determine a touch frame frequency according to the scan start signal,
wherein when the display frame frequency is not changed, the timing circuit adjusts the scan start signal to change the touch frame frequency.

31. The electronic circuit according to claim 30, wherein during a first period, the touch frame frequency is a non-integer multiple of the display frame frequency.

32. The electronic circuit according to claim 31, wherein during a second period, the touch frame frequency is an integer multiple of the display frame frequency.

33. A electronic circuit, adapted to drive a display panel comprising touch sensors, comprising:
a display driving circuit, configured to drive a touch display panel according to a display frame frequency to display a plurality of video frames;
a timing circuit, configured to receive a flag signal from a processing circuit and generate a scan start signal according to the flag signal; and
a touch scan circuit, coupled to the timing circuit to receive the scan start signal and performing touch scanning according to the scan start signal,
wherein the scan start signal defines a touch frame period started at a mode transition time, the mode transition time is a transition time from a special mode to a normal mode, and a touch function is disabled in the special mode and is enabled in the normal mode.

* * * * *